(12) United States Patent
Chen et al.

(10) Patent No.: US 12,467,765 B2
(45) Date of Patent: Nov. 11, 2025

(54) SYSTEM FOR FUSING TWO OR MORE VERSIONS OF MAP DATA

(71) Applicant: GM Global Technology Operations LLC, Detroit, MI (US)

(72) Inventors: Gui Chen, Sterling Heights, MI (US); Bo Yu, Troy, MI (US); Shuqing Zeng, Sterling Heights, MI (US); Fan Bai, Ann Arbor, MI (US); Joon Hwang, Pflugerville, TX (US); Vivek Vijaya Kumar, Shelby Township, MI (US); Mason David Gemar, Cedar Park, TX (US); Carl P. Darukhanavala, Royal Oak, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 336 days.

(21) Appl. No.: 18/318,247

(22) Filed: May 16, 2023

(65) Prior Publication Data

US 2024/0385010 A1 Nov. 21, 2024

(51) Int. Cl.
*G01C 21/00* (2006.01)
(52) U.S. Cl.
CPC .............................. *G01C 21/3811* (2020.08)
(58) Field of Classification Search
None
See application file for complete search history.

(56) References Cited

U.S. PATENT DOCUMENTS

| | | |
|---|---|---|
| 6,385,539 B1 | 5/2002 | Wilson et al. |
| 8,868,335 B2 | 10/2014 | Nowak et al. |
| 2010/0191461 A1 | 7/2010 | Zeng |
| 2019/0301873 A1* | 10/2019 | Prasser .............. G01C 21/3848 |
| 2019/0302801 A1 | 10/2019 | Zlot et al. |
| 2020/0240794 A1 | 7/2020 | Prasser et al. |

(Continued)

FOREIGN PATENT DOCUMENTS

| | | | |
|---|---|---|---|
| CN | 111651547 | * | 9/2020 |
| DE | 102021121834 A1 | | 3/2022 |

OTHER PUBLICATIONS

"Section Lines," Virtual Surveyor, 2023, https://support.virtual-surveyor.com/support/solutions/articles/1000291621-section-lines.

(Continued)

*Primary Examiner* — Hongye Liang
(74) *Attorney, Agent, or Firm* — Vivacqua Crane, PLLC (57) ABSTRACT

A system for fusing two or more versions of map data together includes one or more central computers that receive road network data representing a road network for a pre-defined geofenced area. The central computers compute a plurality of points that are each positioned at a predetermined distance from one another. The central computers create a plurality of bounding boxes for the road network based on the plurality of points and create a set of closest matched map data points for each bounding box that is part of the road network by executing a map-matching registration algorithm to align the two or more versions of map data with one another. The central computers execute a maximum likelihood estimation algorithm to determine probability distribution parameters of the set of closest matched map data points compared to the ground truth map data.

11 Claims, 6 Drawing Sheets

(56) References Cited

U.S. PATENT DOCUMENTS

| | | |
|---|---|---|
| 2020/0393268 A1 | 12/2020 | Schroeter |
| 2020/0393567 A1 | 12/2020 | Schroeter |
| 2021/0140769 A1 | 5/2021 | Langland et al. |
| 2021/0213973 A1 | 7/2021 | Carillo Peña et al. |
| 2021/0343142 A1 | 11/2021 | Lewis et al. |
| 2022/0035376 A1 | 2/2022 | Laddah et al. |
| 2022/0113159 A1 | 4/2022 | Hou et al. |
| 2022/0126833 A1 | 4/2022 | Zhao et al. |
| 2022/0215603 A1 | 7/2022 | Goldman et al. |
| 2023/0125048 A1 | 4/2023 | Iguchi et al. |
| 2023/0209099 A1 | 6/2023 | Hur et al. |
| 2024/0412877 A1* | 12/2024 | Gee .................. G16H 40/67 |

OTHER PUBLICATIONS

Edelkamp, S., et al. "Route Planning and Map Inference with Global Positioning Traces," Comp. Sci. in Perspective (Ottmann Festschrift), 2003, pp. 128-151.

Schroedl, S., et al. "Mining GPS Traces for Map Refinement," Data Mining and Knowledge Discovery, vol. 9, 2004, pp. 59-87.

United States Patent and Trademark Office. U.S. Appl. No. 17/821,898, filed Aug. 24, 2022.

United States Patent and Trademark Office. U.S. Appl. No. 17/930,503, filed Sep. 8, 2022.

United States Patent and Trademark Office. U.S. Appl. No. 18/171,848, filed Feb. 21, 2023.

* cited by examiner

SYSTEM FOR FUSING TWO OR MORE VERSIONS OF MAP DATA

INTRODUCTION

The present disclosure relates to a system for fusing two or more versions of map data together to create fused map data.

An autonomous vehicle executes various tasks such as, but not limited to, perception, localization, mapping, path planning, decision making, and motion control. Autonomous vehicles rely upon map data for many of the tasks that are executed such as localization, mapping, and path planning. It is to be appreciated that different versions of map data representing the same geographical area may be generated, where each version of the map data is generated from different data sources.

One example of a version of map data is crowdsourced map data. Crowdsourced map data is generated based on global positioning system (GPS) data and data collected by vehicles on the road. Some examples of the data collected by the vehicles include image data collected by an on-board camera, vehicle speed, and yaw sensor data. While crowdsourced maps provide real-time information for constructing lane lines as well as clear lane line attributes, crowdsourced maps may face challenges because of calibration issues with the on-board camera. Also, the GPS data may introduce bias and random noise to the crowdsourced map.

Map data based on telemetry data, such as a high-speed vehicle telemetry (HSVT) source, provides a high confidence level and is usually relatively easy to procure. However, telemetry-based map data does not provide lane line attributes such as color and type. Also, telemetry-based map data is determined based on the behavior of individual drivers who operate the vehicles. Aerial map data, which is based on satellite image data, may provide a high degree of precision. However, aerial map data may not consistently provide lane line attributes. Moreover, aerial maps are time-consuming to create, may be outdated depending on when images were collected, and may contain regions that are occluded due to issues such as tree cover. Finally, high-definition map data is generated based on data collected from survey vehicles and may provide a high degree of precision as well as lane line attributes. However, high-definition map data is time-consuming to update.

Thus, while maps for autonomous vehicles achieve their intended purpose, there is a need in the art for an improved approach for procuring map data that alleviates the above-mentioned challenges.

SUMMARY

According to several aspects, a system for fusing two or more versions of map data together is disclosed. The system includes one or more central computers in wireless communication with one or more communication networks for receiving the two or more versions of map data and ground truth map data, where each version of the map data represents a predefined geofenced area. The one or more central computers execute instructions to receive road network data representing a road network for the predefined geofenced area, where the road network is a graph that models roadways based on a plurality of road segments. The central computers compute a plurality of points that are each positioned at a predetermined distance from one another, where the plurality of points divides an individual road segment of the plurality of road segments by the predetermined distance. The central computers create a plurality of bounding boxes for the road network based on the plurality of points. The central computers create a set of closest matched map data points for each bounding box that is part of the road network by executing a map-matching registration algorithm to align the two or more versions of map data with one another. The central computers execute a maximum likelihood estimation algorithm to determine probability distribution parameters of the set of closest matched map data points compared to the ground truth map data. The central computers fuse the set of closest matched map data points together to create fused map data based on the probability distribution parameters.

In another aspect, the one or more central computers execute instructions to calculate a map fusion offset between individual fused map data points of the fused map data and corresponding map data points of the ground truth map data, where the map fusion offset represents an absolute map error.

In yet another aspect, the probability distribution parameters include a mean value of a first offset between a first set of map data points and the ground truth map data, a mean value of a second offset between a second set of map data points and the ground truth map data, a variance of the first offset, and a variance of the second offset.

In an aspect, the one or more central computers execute instructions to evaluate map fusion performance by comparing a mean value and a standard deviation of the map fusion offset with the mean value and a standard deviation of the first offset, and by comparing the mean value and the standard deviation of the map fusion offset with the mean value and a standard deviation of the second offset.

In another aspect, the plurality of bounding boxes each represent a single unit for executing the map-matching registration algorithm to align the two or more versions of map data with one another.

In yet another aspect, the predetermined distance defines a width of a single bounding box.

In an aspect, each of the plurality of bounding boxes include a lateral dimension and a longitudinal dimension that correspond to a perception range for a vehicle.

In another aspect, a plurality of nodes each represents an endpoint of one of the road segments.

In yet another aspect, the road network includes a plurality of line strings, and where each line string connects two of the plurality of nodes together.

In an aspect, the map-matching registration algorithm is an iterative closest point (ICP) algorithm.

In another aspect, the two or more versions of map data are each based on one or more of the following: global positioning system (GPS) data, image data collected by an on-board camera for a vehicle, a high-speed vehicle telemetry (HSVT) source, satellite image data, and data collected from survey vehicles.

In yet another aspect, the one or more central computers execute instructions to create an offset distribution histogram based on the ground truth map data and the set of closest matched map data points for each bounding box that is part of the road network.

In an aspect, a portion of map data points that are part of the set of closest matched map data points represent one or more landmarks.

In another aspect, a method for fusing two or more versions of map data together. The method includes receiving, by one or more central computers, road network data representing a road network for a predefined geofenced area, where the road network is a graph that models roadways based on a plurality of road segments. The method includes computing, by the one or more central computers, a plurality of points that are each positioned at a predetermined distance from one another, where the plurality of points divides an individual road segment of the plurality of road segments by the predetermined distance. The method includes creating, by the one or more central computers, a plurality of bounding boxes for the road network based on the plurality of points. The method includes creating, by the one or more central computers, a set of closest matched map data points for each bounding box that is part of the road network by executing a map-matching registration algorithm to align the two or more versions of map data with one another, where each version of the map data represents the same predefined geofenced area. The method includes executing a maximum likelihood estimation algorithm to determine probability distribution parameters of the set of closest matched map data points compared to the ground truth map data. Finally, the method includes fusing the set of closest matched map data points together to create fused map data based on the probability distribution parameters.

In another aspect, the method includes calculating a map fusion offset between individual fused map data points of the fused map data and corresponding map data points of the ground truth map data, where the map fusion offset represents an absolute map error.

In yet another aspect, the probability distribution parameters include a mean value of a first offset between a first set of map data points and the ground truth map data, a mean value of a second offset between a second set of map data points and the ground truth map data, a variance of the first offset, and a variance of the second offset.

In an aspect, the method comprises evaluating map fusion performance by comparing a mean value and a standard deviation of the map fusion offset with the mean value and a standard deviation of the first offset, and by comparing the mean value and the standard deviation of the map fusion offset with the mean value and a standard deviation of the second offset.

In another aspect, a system for fusing two or more versions of map data together is disclosed. The system includes one or more central computers in wireless communication with one or more communication networks for receiving the two or more versions of map data and ground truth map data, where each version of the map data represents a predefined geofenced area. The one or more central computers execute instructions to receive road network data representing a road network for the predefined geofenced area, where the road network is a graph that models roadways based on a plurality of road segments. The one or more central computers compute a plurality of points that are each positioned at a predetermined distance from one another, where the plurality of points divides an individual road segment of the plurality of road segments by the predetermined distance. The central computers create a plurality of bounding boxes for the road network based on the plurality of points, where the plurality of bounding boxes each represent a single unit for executing an iterative closest point (ICP) algorithm to align the two or more versions of map data with one another. The central computers create a set of closest matched map data points for each bounding box that is part of the road network by executing the ICP algorithm to align the two or more versions of map data with one another, and where the predetermined distance defines a width of a single bounding box. The one or more central computers execute a maximum likelihood estimation algorithm to determine probability distribution parameters of the set of closest matched map data points compared to the ground truth map data. The one or more central computers fuse the set of closest matched map data points together to create fused map data based on the probability distribution parameters.

In still another aspect, the one or more central computers execute instructions to calculate a map fusion offset between individual fused map data points of the fused map data and corresponding map data points of the ground truth map data, where the map fusion offset represents an absolute map error.

In an aspect, the probability distribution parameters include a mean value of a first offset between a first set of map data points and the ground truth map data, a mean value of a second offset between a second set of map data points and the ground truth map data, a variance of the first offset, and a variance of the second offset.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
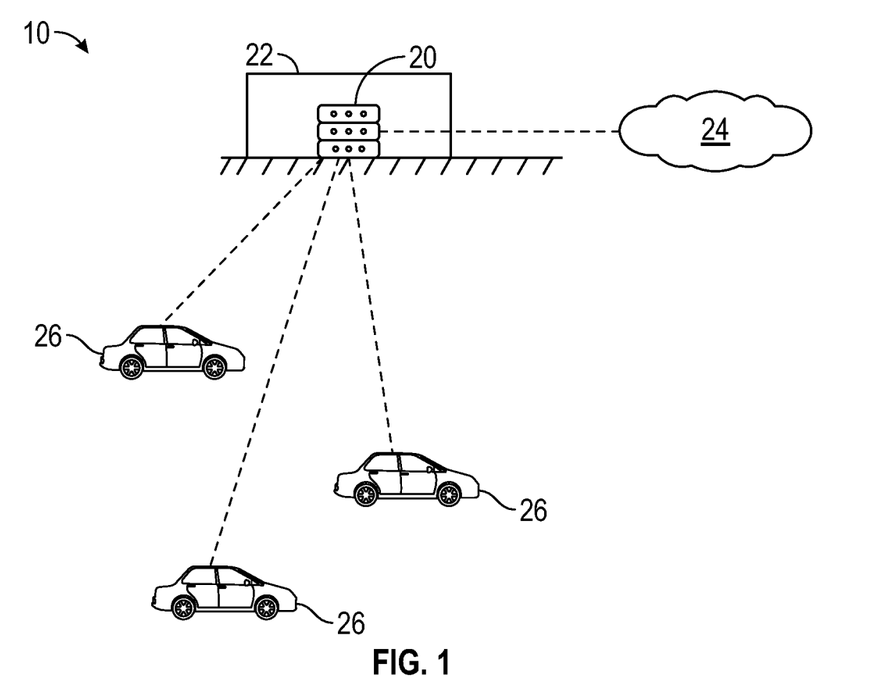
FIG. 1 is a schematic diagram of the disclosed system for fusing together two or more versions of map data, where the system includes one or more central computers that receive map data from different sources across a network, according to an exemplary embodiment.

Referring to FIG. 1, an exemplary system 10 for fusing together two or more versions of map data is illustrated. The system 10 includes one or more central computers 20 located at a back-end office 22, where the one or more central computers 20 are in wireless communication with one or more communication networks 24. The one or more central computers 20 obtain the two or more versions of map data and ground truth map data via the one or more communication networks 24. Each version of the map data represents the same predefined geofenced area, where the predefined geofenced area represents a real-world geographical area that is defined by a virtual perimeter. It is to be appreciated that each version of the map data is based on a unique source of data such as, for example, global positioning system (GPS) data, image data collected by an on-board camera of a vehicle, a high-speed vehicle telemetry (HSVT) source, satellite image data, or data collected from survey vehicles. Some examples of versions of map data include, but are not limited to, crowdsourced map data, telemetry-based map data, and aerial map data. It is also to be appreciated that high-definition map data represents the ground truth map data.

Figure 2:
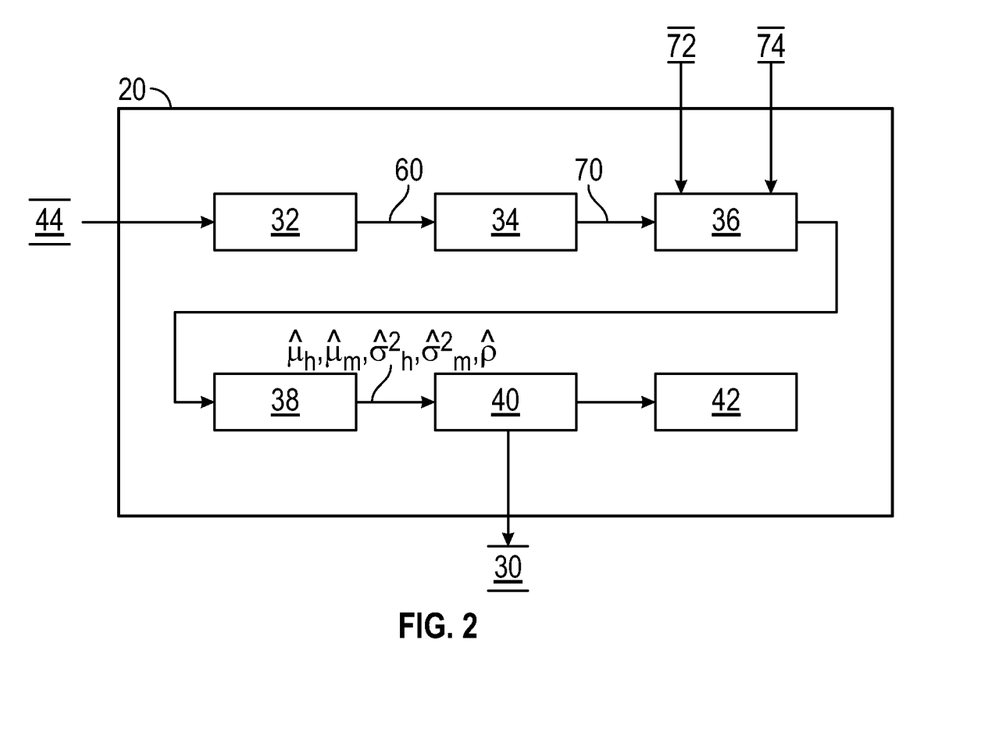
FIG. 2 is a block diagram illustrating the software architecture for the one or more central computers shown in FIG. 1, according to an exemplary embodiment.

In one non-limiting embodiment, the map data is created specifically for an autonomous driving system such as, for example, an automated driving system (ADS) or an advanced driver assistance system (ADAS). In another embodiment, the map data is created for inventory of roadway features, control devices, and the like. In an embodiment, other dynamic map layers may be introduced on top of the map data, such as map layers indicating roadway surface or traffic conditions. As explained below, the system 10 fuses together the two or more versions of map data to create fused map data 30 (FIG. 2). Since the fused map data 30 is based on more than one unique source of data, the fused map data 30 includes a greater precision and accuracy when compared to the original versions of map data alone. In the non-limiting embodiment as shown in FIG. 1, the one or more central computers 20 are in wireless communication with one or more autonomous vehicles 26. After determining the fused map data 30, the one or more central computers 20 may share the fused map data 30 with the one or more autonomous vehicles 26.

FIG. 2 is a block diagram illustrating the software architecture of the one or more central computers 20 shown in FIG. 1. In the example as shown in FIG. 2, the one or more central computers 20 includes a road segmentation module 32, a bounding box module 34, a closest matched pairs module 36, a sensor noise model module 38, a fusion module 40, and a statistical analysis module 42. The road segmentation module 32 of the one or more central computers 20 receives road network data 44 representing a road network 50 (FIG. 3) for the predefined geofenced area as input from the one or more communication networks 24 (FIG. 1). One example of road network data 44 is the open street map (OSM), however, it is to be appreciated that other types of road network data may be used as well.

Figure 3:
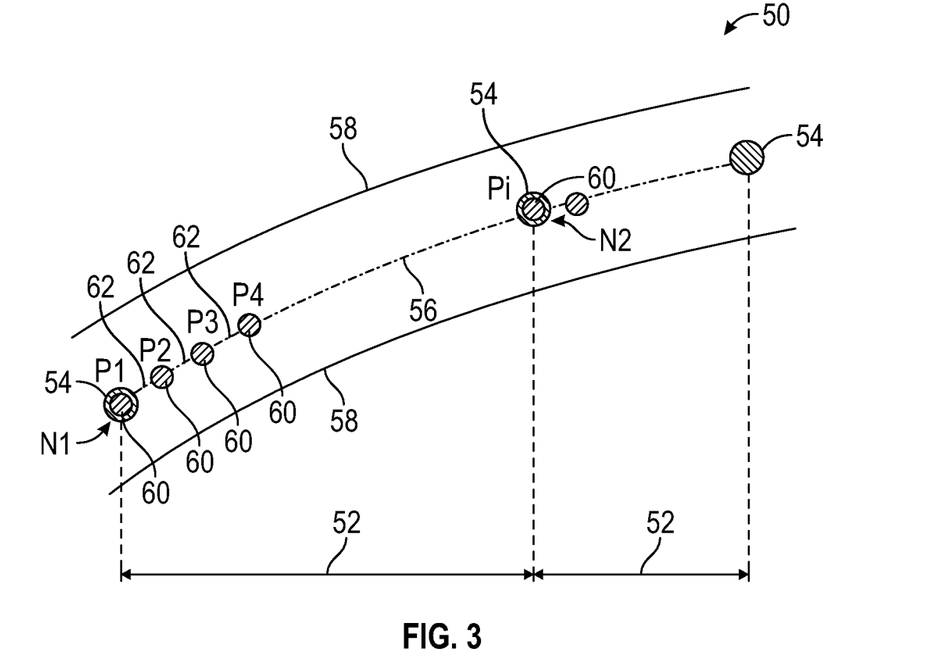
FIG. 3 is an exemplary illustration of a portion of a road network, where a plurality of points are disposed along a line string of the road network, according to an exemplary embodiment.

FIG. 3 is an exemplary illustration of a portion of the road network 50. Referring to both FIGS. 2 and 3, the road network 50 is a graph that models roadways based on a plurality of road segments 52, a plurality of nodes 54, a plurality of line strings 56, and opposing road edges 58. The plurality of nodes 54 each represents an endpoint of one of the road segments 52, where each line string 56 connects two of the plurality of nodes 54 together. It is to be appreciated that the opposing road edges 58 represent theoretical lane or road edges, and not the opposing topological graph edges. Referring to both FIGS. 2 and 3, the road segmentation module 32 of the one or more central computers 20 computes a plurality of points 60 that are disposed along the plurality line strings 56. The plurality of points 60 are each positioned at a predetermined distance from one another. The plurality of points 60 divide an individual road segment 52 by the predetermined distance into segments 62. The predetermined distance defines a width W of a single bounding box 70 (shown in FIG. 4A). The predetermined distance represents a perception range of a vehicle that is traveling along the road represented by the road network 50. In one non-limiting embodiment, the predetermined distance is about fifty meters, however, it is to be appreciated that other dimensions may be used as well.

Referring to FIGS. 2 and 3, in an embodiment, the road segmentation module 32 of the one or more central computers 20 determine the plurality of points 60 by starting at a first node N1 of an initial road segment 52 and placing a first predetermined point P1 at the first node N1. The road segmentation module 32 then determines a subsequent point P2 at the predetermined distance along the line string 56. The road segmentation module 32 continues to determine the predetermined points [P3, P4 . . . Pi] for the entire length of the road segment 52. In the event the last point Pi is disposed at a distance less than the predetermined distance from an end node N2 where the road segment 52 terminates, then the length of the last segment 62 is less than the predetermined distance.

Figure 4A:
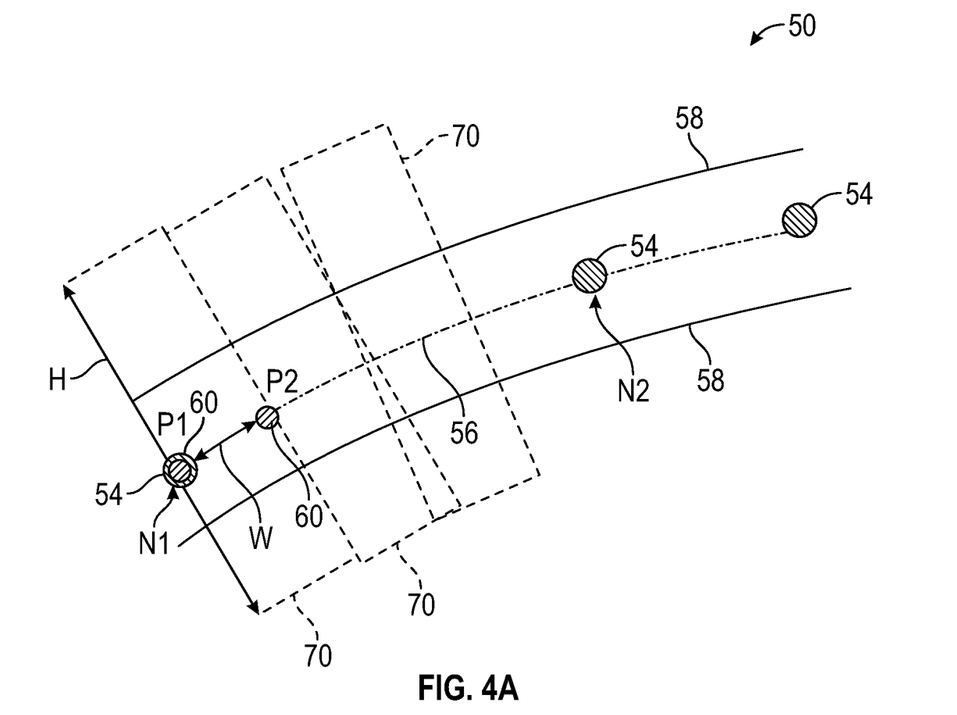
FIG. 4A is an exemplary illustration of the road network shown in FIG. 3, where bounding boxes are created based on the plurality of points, according to an exemplary embodiment.

FIG. 4A is an exemplary illustration of the road network 50 shown in FIG. 3 including a plurality of bounding boxes 70, where the bounding box module 34 (FIG. 2) creates the plurality of bounding boxes 70 based on the plurality of points 60. The plurality of bounding boxes 70 each represent a single unit for executing a point-cloud registration algorithm, which is referred to as a map-matching registration algorithm, to align the two or more versions of map data points 72, 74 with one another. Referring to FIGS. 2 and 4A, each bounding box 70 includes a lateral dimension that is perpendicular to the road segments 52 (i.e., the width W) and a longitudinal dimension that is aligned with the road segments 52 (i.e., a height H) that correspond to the perception range of a vehicle traveling along the road represented by the road network 50. Specifically, in the example as shown in FIG. 4A, the width W of the bounding box 70 is defined between points P1 and P2, which is the predetermined distance between the plurality of points 60.

Figure 4B:
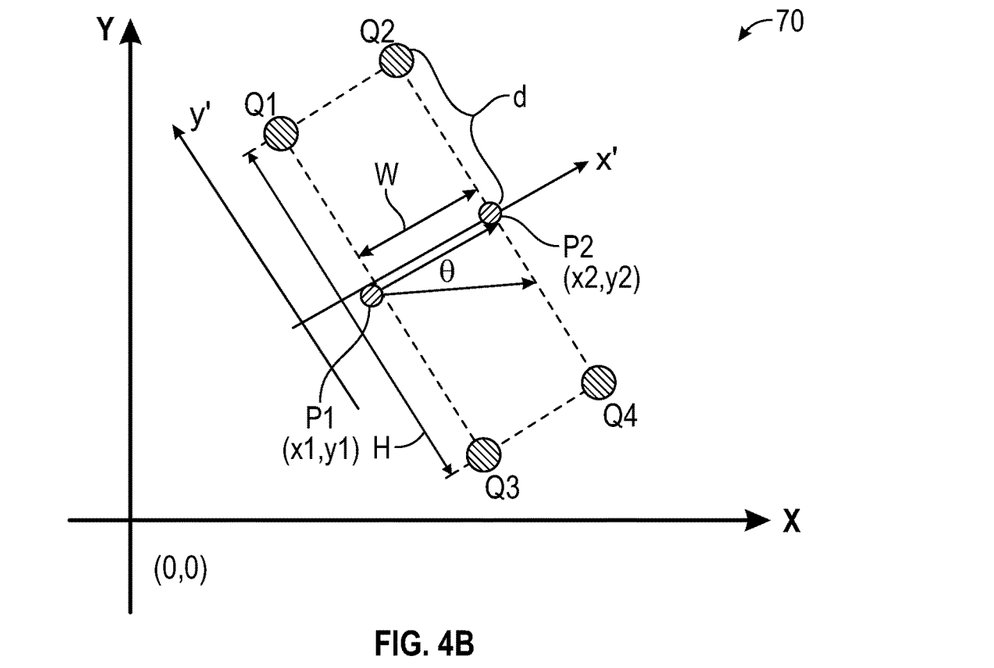
FIG. 4B is an exemplary illustration of one of the bounding boxes shown in FIG. 4A, according to an exemplary embodiment.

FIG. 4B illustrates one of the bounding boxes 70 shown in FIG. 4A. Referring to both FIGS. 2 and 4B, an exemplary approach for determining the width W and the height H of the bounding box 70 shall now be described. FIG. 4B illustrates a vehicle coordinate system x'y', where the x'-axis is parallel with respect to the road edges 58 (FIG. 4A) and the y'-axis is perpendicular with respect to the road edges 58. The heading angle θ represents a heading angle of a vehicle traveling along the road segment 52 (FIG. 4A), the coordinates x1, y1 represent the coordinates of the first point P1, the coordinates x2, y2 represent the coordinates of the second point P2, a distance d represents half the height H of the bounding box 70, and Q1, Q2, Q3, Q4 represent corner points of the bounding box 70. In the example as shown, coordinates for a left upper corner point Q1 are expressed as Q1=(x1, y1+d), coordinates for a right upper corner point Q2 are expressed as Q2=(x2, y2+d), coordinates for a left lower corner point Q3 are expressed as Q3=(x1, y1−d), and coordinates for a right lower corner point Q4 are expressed as Q4=(x2, y2−d).

Figure 5A:
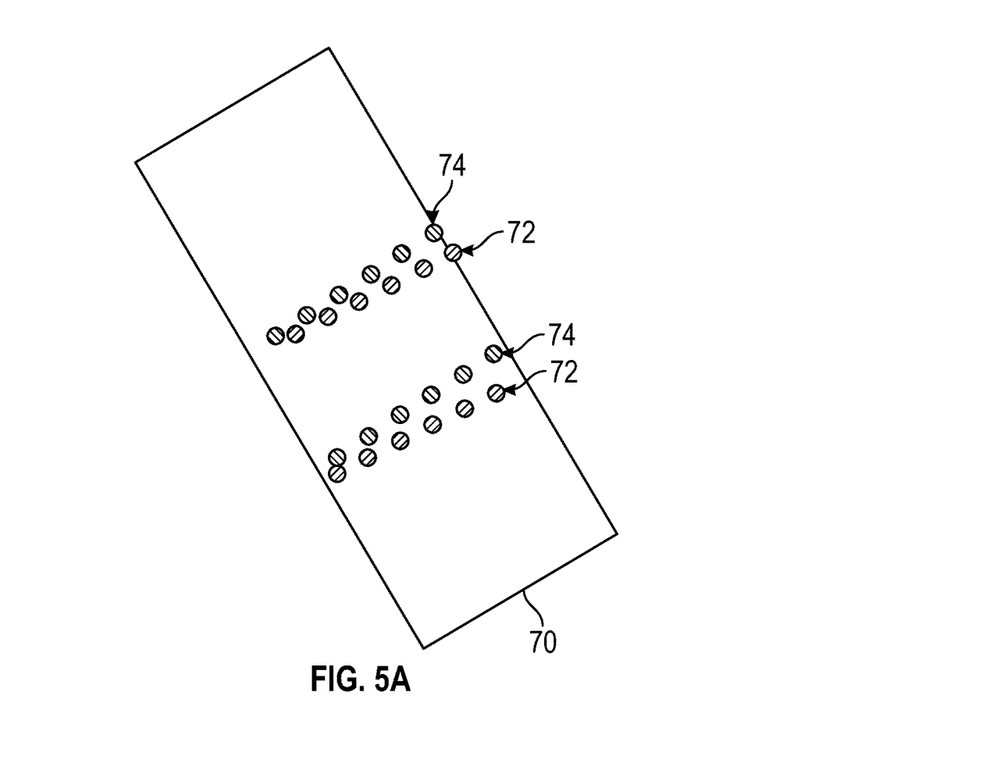
FIG. 5A illustrates an exemplary bounding box including map data points before a map-matching registration algorithm is executed, according to an exemplary embodiment.
Figure 5B:
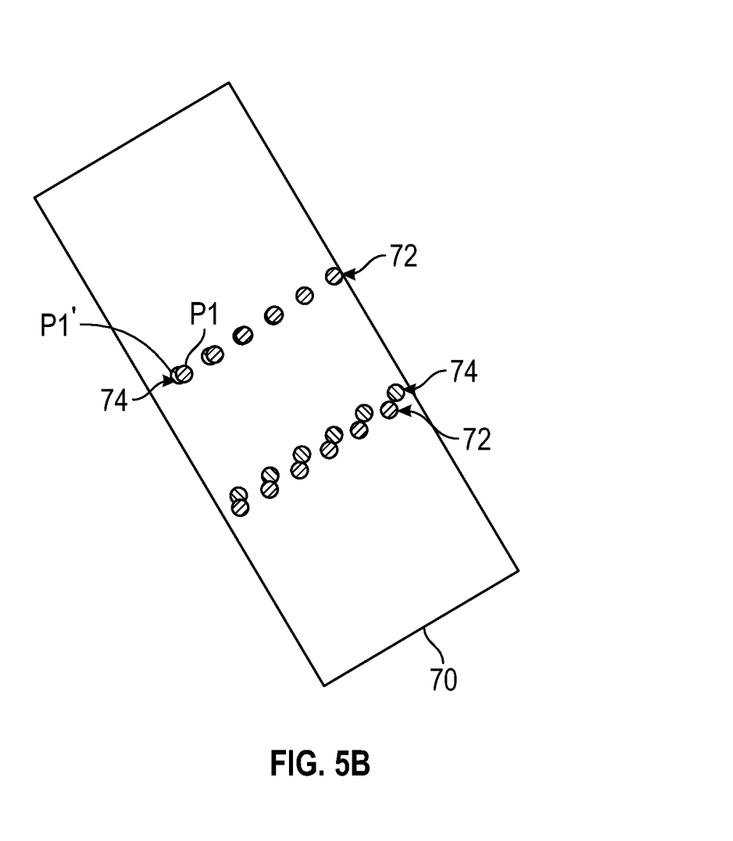
FIG. 5B illustrates the bounding box shown in FIG. 5A after the map-matching registration algorithm is executed, according to an exemplary embodiment.

Referring to FIG. 2, once the bounding box module 34 creates the bounding boxes 70, the closest matched pairs module 36 of the one or more central computers 20 then create a set of closest matched map data points for each bounding box 70 that is part of the road network 50 by executing the map-matching registration algorithm to align the two or more versions of map data with one another. FIGS. 5A and 5B illustrate an exemplary bounding box 70 including a first set of map data points 72 that correspond to a first version of the map data and a second set of map data points 74 that correspond to a second version of the map data. Specifically, the bounding box 70 shown in FIG. 5A illustrates the map data points 72, 74 before the map-matching registration algorithm is executed, and the bounding box 70 shown in FIG. 5B illustrates the map data points 72, 74 after the map-matching registration algorithm is executed. In an embodiment, the map-matching registration algorithm is an iterative closest point (ICP) algorithm, however, other types of algorithms may be used as well. In an embodiment, the map data points 72, 74 that are part of the set of closest matched map data points represent lane lines that are disposed along a roadway. However, it is to be appreciated that in addition to lane lines, a portion of the map data points 72, 74 may also represent one or more landmarks. Some examples of landmarks include, but are not limited to, traffic lights, road signs, or transverse pavement markings such as stop lines, yield lines, and crosswalks.

The map-matching registration algorithm aligns the first set of map data points 72 and the second set of map data points 74 with one another by translating or rotating one set of map data points 72, 74 to be positioned closer to the remaining set of map data points 72, 74. The k-nearest neighbor algorithm is then executed to identify the set of closest matched map data points between the first set of map data points 72 and the second set of map data points 74. In the example as shown in FIG. 5B, p1 from the first set of map data points 72 and p1' from the second set of map data points 74 represent a set of matched map data points. It is to be appreciated that some map data points may not have a corresponding matched map data point that belongs to the other set of map data points. It is also to be appreciated that crowdsourced map data and telemetry-based map data do not change location when the map-matching registration algorithm is executed.

Figure 6A:
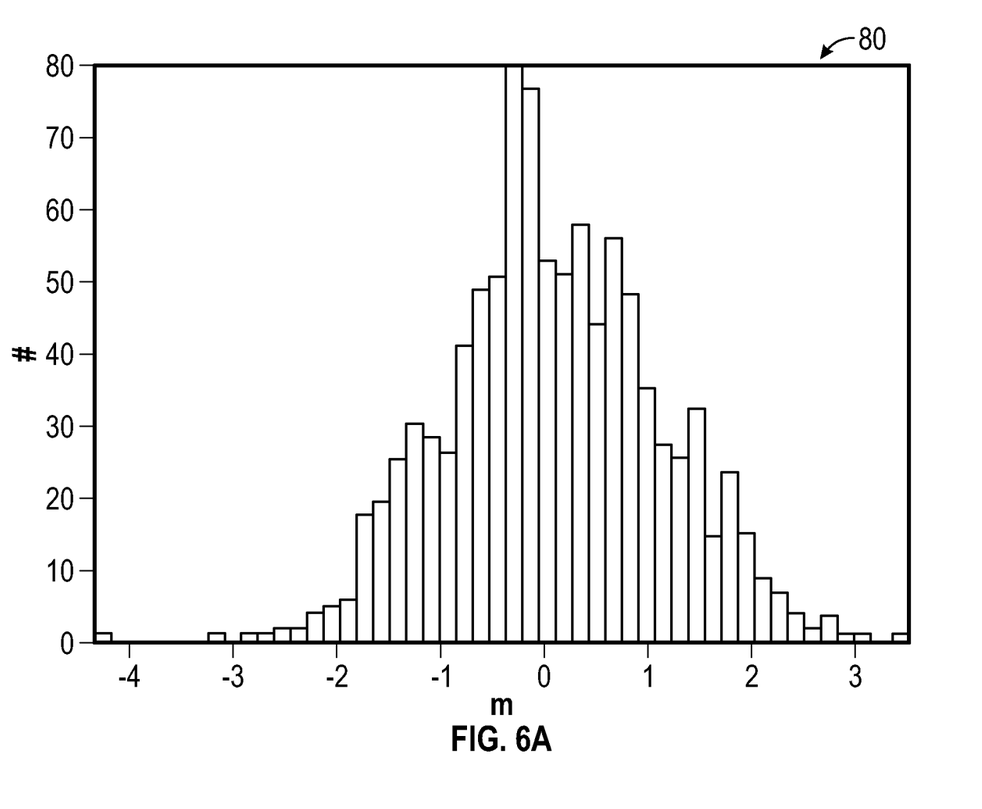
FIG. 6A illustrates an exemplary sensor noise model, according to an exemplary embodiment.

Referring to FIGS. 2, 5B, and 6A, the sensor noise model module 38 of the one or more central computers 20 then creates an offset distribution histogram, which is referred to as a sensor noise model 80 and is shown in FIG. 6A, based on the set of closest matched map data points between the first set of map data points 72 and the second set of map data points 74 for each bounding box 70 that is part of the road network 50 and ground truth map data. As seen in FIG. 6A, the sensor noise model 80 includes an x-axis that indicates a map point offset representing a distance between each of the matched map data points from the set of closest matched map data points and a corresponding ground truth map data point, which is measured in meters, and a y-axis that indicates the number of points that correspond to each distance from the corresponding ground truth map data point.

Figure 6B:
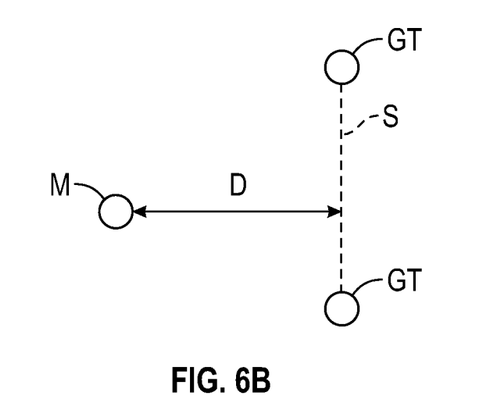
FIG. 6B illustrates a perpendicular distance measured between an exemplary map data point and a corresponding ground truth map data point.

Referring specifically to FIG. 5B, each bounding box 70 includes a dataset D, where D={$(l_{h,i}, l_{m,i}, GT_i)|i=1, \ldots, N$}, and $l_{h,i}$ represents a point from the first set of map data points 72, $l_{m,i}$ represents a point from the second set of map data points 74, and $GT_i$ represents a point from the ground truth map data. The sensor noise model module 38 of the one or more central computers 20 executes a maximum likelihood estimation algorithm to determine probability distribution parameters of the set of closest matched map data points compared to the ground truth map data. In one non-limiting embodiment, the probability distribution parameters include $\hat{\mu}_h$, which represents a mean value of a first offset between the first set of map data points 72 and the ground truth map data, $\hat{\mu}_m$, which represents a mean value of a second offset between the second set of map data points 74 and the ground truth map data, $\hat{\sigma}_h^2$, which represents a variance of the first offset, $\hat{\sigma}_m^2$, which represents a variance of the second offset, and $\hat{\rho}$, which represents a correlation coefficient between the first set of map data points 72 and the second set of map data points 74. FIG. 6B is an exemplary illustration explaining how the map point offset described in the sensor noise model 80 shown in FIG. 6A, the first offset, the second offset, and a map fusion offset (which is described below) are measured. Specifically, the map point offset, the first offset, the second offset, and the map fusion offset represent a perpendicular distance D measured between a respective map data point M and an imaginary line segment S that connects two ground truth map data points GT together.

In one embodiment, the probability distribution parameters are determined based on Equations 1-5, which are as follows:

$$\hat{\mu}_h = \frac{1}{N} \sum_i^N (l_{h,i} - GT_i) \quad \text{Equation 1}$$

$$\hat{\mu}_m = \frac{1}{N} \sum_i^N (l_{m,i} - GT_i) \quad \text{Equation 2}$$

$$\hat{\sigma}_h^2 = \frac{1}{N} \sum_i^N (l_{h,i} - GT_i - \hat{\mu}_h)(l_{h,i} - GT_i - \hat{\mu}_h) \quad \text{Equation 3}$$

$$\hat{\sigma}_m^2 = \frac{1}{N} \sum_i^N (l_{m,i} - GT_i - \hat{\mu}_m)(l_{m,i} - GT_i - \hat{\mu}_m) \quad \text{Equation 4}$$

$$\hat{\rho} = \frac{1}{N} \sum_i^N (l_{h,i} - GT_i - \hat{\mu}_h)(l_{m,i} - GT_i - \hat{\mu}_m)/(\hat{\sigma}_h \hat{\sigma}_m) \quad \text{Equation 5}$$

where N represents the sample size, and $GT_i$ represents the ground truth map data.

Referring to FIG. 2, the fusion module 40 of the one or more central computers 20 then determines the fused map data 30 by fusing the set of closest matched map data points between the first set of map data points 72 and the second set of map data points 74 (shown in FIG. 5B) together based on the probability distribution parameters determined by the sensor noise model module 38 of the one or more central computers 20. Specifically, the fusion module 40 determines a fused regressor $l_F$ based on the probability distribution parameters. It is to be appreciated that individual fused map data points of the fused map data 30 are calculated based on the fused regressor $l_F$. As mentioned above, in an embodiment, a portion of the map data points 72, 74 represent landmarks. In the event the map data points 72, 74 represent landmarks, the fusion module 40 of the one or more central computers 20 may fuse the map data points 72, 74 representing landmarks classified as including the highest priority first. After the map data points 72, 74 representing the landmarks classified with the highest priority are fused together, the fusion module 40 then fuses the map data points 72, 74 representing landmarks classified as having a lower priority, where the relative distances between the map data points 72, 74 are adjusted.

The priority of the landmarks may be determined based on the uniqueness of a landmark in a particular environment. For example, in some very rural or sparsely populated areas, a traffic light may be unique and hard to find. As a result, the traffic light would be assigned the highest priority in a rural area. The relative distances between the landmarks are adjusted by first determining average lateral and longitudinal distances between higher priority landmarks for the first set of map data points 72 and the second set of map data points 74 as well as the average lateral and longitudinal distances between lower priority landmarks for the first set of map data points 72 and the second set of map data points 74. If the average lateral and longitudinal distances between the higher priority landmarks and the lower priority landmarks are about equal, then no relative distance adjustment is required. However, if the average lateral and longitudinal distances between the lower priority landmarks are greater than the average lateral and longitudinal distances between the lower priority landmarks, then the lateral and longitudinal distances between the lower priority landmarks are decreased incrementally until the average lateral and longitudinal distances between the higher priority landmarks and the lower priority landmarks are about equal.

The fused regressor $l_F$ and a fused variance $\sigma_F^2$ may be determined based on Equations 6-16:

$$l_h = L(p) + e_h \quad \text{Equation 6}$$

$$l_m = L(p) + e_m \quad \text{Equation 7}$$

$$e_h \sim N(\mu_h, \sigma_h) \quad \text{Equation 8}$$

$$e_m \sim N(\mu_m, \sigma_m) \quad \text{Equation 9}$$

$$\rho = E\{(e_h - \mu_h)(e_h - \mu_h)\}/(\sigma_h \sigma_m) \quad \text{Equation 10}$$

$$l = \begin{bmatrix} l_h \\ l_m \end{bmatrix} = Al + e \quad \text{Equation 11}$$

$$A = \begin{bmatrix} 1 \\ 1 \end{bmatrix}, e \sim N(\mu, \Sigma) \quad \text{Equation 12}$$

$$\mu = \begin{bmatrix} \mu_h \\ \mu_m \end{bmatrix} \quad \text{Equation 13}$$

$$\Sigma = \begin{bmatrix} \sigma_h^2 & \rho\sigma_h\sigma_m \\ \rho\sigma_h\sigma_m & \sigma_m^2 \end{bmatrix} \quad \text{Equation 14}$$

$$l_F = \left(A^T \Sigma^{-1} A\right)^{-1} A^T \Sigma^{-1} l \quad \text{Equation 15}$$

$$\sigma_F^2 = \left(A^T \Sigma^{-1} A\right)^{-1} \quad \text{Equation 16}$$

where $l_h$ represents a lane line estimation for the first set of map data points 72, $l_m$ represents a lane line estimation for the second set of map data points 72, L (p) represents the ground truth value at position p within a lane line, $e_h$ is a Gaussian random variable for the first set of map data points 72, $e_m$ is a Gaussian random variable for the second set of map data points 74, A is a matrix including all ones, E represents expectation, l represents a point in the map data, μ represents the mean value, and Σ represents the covariance matrix.

Once the fused map data 30 is determined, in an embodiment the statistical analysis module 42 of the one or more central computers 20 may then evaluate map fusion performance by statistical analysis. In one embodiment, the statistical analysis module 42 calculates a map fusion offset between the individual fused map data points of the fused map data 30 and the corresponding map data points of the ground truth map data, where the map fusion offset represents an absolute map error. As mentioned above and shown in FIG. 6B, it is to be appreciated that the map fusion offset represents the perpendicular distance D measured between a respective map data point M and the imaginary line segment S that connects two ground truth map data points GT together. The statistical analysis module 42 then calculates a mean value and a standard deviation of the map fusion offset. The statistical analysis module 42 then evaluates map fusion performance by comparing the mean value and the standard deviation of the map fusion offset with the mean value and a standard deviation of the first offset, and by comparing the mean value and the standard deviation of the map fusion offset with the mean value and a standard deviation of the second offset.

Figure 7:
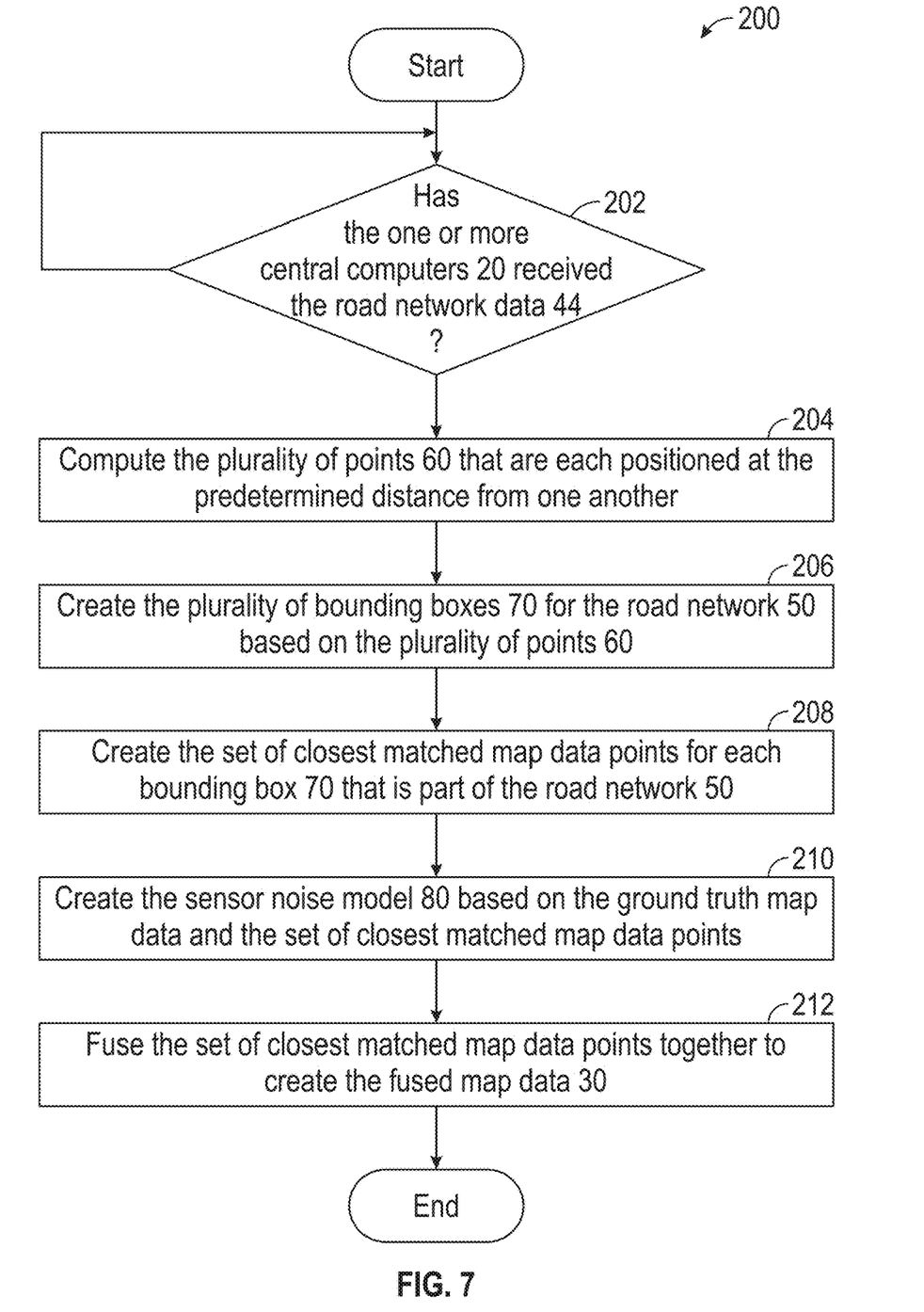
FIG. 7 process flow diagram illustrating a method for fusing two or more versions of map data together by the system illustrated in FIG. 1, according to an exemplary embodiment.

FIG. 7 is a process flow diagram illustrating a method 200 for fusing two or more versions of map data together. Referring generally to FIGS. 1-7, the method 200 may begin at decision block 202. In decision block 202, the road segmentation module 32 of the one or more central computers 20 continues to monitor the one or more communication networks 24 until receiving the road network data 44 representing the road network 50 (FIG. 3) for the predefined geofenced area. As mentioned above, the road network 50 is a graph that models roadways based on the plurality of road segments 52. The method 200 may then proceed to block 204.

In block 204, the road segmentation module 32 of the one or more central computers 20 compute the plurality of points 60 (FIG. 3) that are each positioned at the predetermined distance from one another, where the plurality of points 60 divides an individual road segment 52 of the plurality of road segments 52 by the predetermined distance. The method 200 may then proceed to block 206.

In block 206, the bounding box module 34 of the one or more central computers 20 create the plurality of bounding boxes 70 (FIG. 4A) for the road network 50 based on the plurality of points 60. Specifically, as seen in FIG. 4A, the predetermined distance defines a width W of a single bounding box 70. The method 200 may then proceed to block 208.

In block 208, the closest matched pairs module 36 of the one or more central computers 20 create the set of closest matched map data points for each bounding box 70 that is part of the road network 50 by executing the map-matching registration algorithm to align the two or more versions of map data with one another. The method 200 may then proceed to block 210.

In block 210, the sensor noise model module 38 of the one or more central computers 20 create the sensor noise model 80 (shown in FIG. 6A) based on the ground truth map data and the set of closest matched map data points for each bounding box 70 that is part of the road network 50. The sensor noise model module 38 also executes the maximum likelihood estimation algorithm to determine the probability distribution parameters of the set of closest matched map data points compared to the ground truth map data. The method 200 may then proceed to block 212.

In block 212, the fusion module 40 of the one or more central computers 20 fuses the set of closest matched map data points together to create the fused map data 30 based on the probability distribution parameters. The method 200 may then proceed to block 214.

In block 214, the statistical analysis module 42 of the one or more central computers 20 may then evaluate map fusion performance based on statistical analysis. Specifically, the statistical analysis module 42 evaluates map fusion performance by comparing the mean value and the standard deviation of the map fusion offset with the mean value and the standard deviation of the first offset, and by comparing the mean value and the standard deviation of the map fusion offset with the mean value and the standard deviation of the first offset. The method 200 may then terminate.

Referring generally to the figures, the disclosed system for fusing together two different versions of map data provides various technical effects and benefits. Specifically, the fused map data provides greater precision and accuracy when compared to the original versions of the map data. Furthermore, the disclosed system also provides an approach for building a sensor noise model based on the fused map data and the ground truth map data. It is to be appreciated that the sensor noise model may be applied in the future to roadways including similar geographic features when ground truth map data is not available.

The central computers may refer to, or be part of an electronic circuit, a combinational logic circuit, a field programmable gate array (FPGA), a processor (shared, dedicated, or group) that executes code, or a combination of some or all of the above, such as in a system-on-chip. Additionally, the controllers may be microprocessor-based such as a computer having a at least one processor, memory (RAM and/or ROM), and associated input and output buses. The processor may operate under the control of an operating system that resides in memory. The operating system may manage computer resources so that computer program code embodied as one or more computer software applications, such as an application residing in memory, may have instructions executed by the processor. In an alternative embodiment, the processor may execute the application directly, in which case the operating system may be omitted.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A system for fusing two or more versions of map data together, the system comprising:
   one or more central computers in wireless communication with one or more communication networks for receiving the two or more versions of map data and ground truth map data, wherein each version of the map data represents a singular predefined geofenced area, the one or more central computers executing instructions to:
   receive road network data representing a road network for the predefined geofenced area, wherein the road network is a graph that models roadways based on a plurality of road segments;
   compute a plurality of points that are each positioned at a predetermined distance from one another, wherein the plurality of points divides an individual road segment of the plurality of road segments by the predetermined distance;
   create a plurality of bounding boxes for the road network based on the plurality of points, wherein the predetermined distance between two of the plurality of points represents a width of one of the plurality of bounding boxes;
   create a set of closest matched map data points for each bounding box that is part of the road network by executing a map-matching registration algorithm to align the two or more versions of map data with one another;
   execute a maximum likelihood estimation algorithm to determine probability distribution parameters of the set of closest matched map data points compared to the ground truth map data, wherein the probability distribution parameters include a mean value of a first offset between a first set of map data points and the ground truth map data, a mean value of a second offset between a second set of map data points and the ground truth map data, a variance of the first offset, and a variance of the second offset;
   fuse the set of closest matched map data points together to create fused map data based on the probability distribution parameters;
   calculate a map fusion offset between individual fused map data points of the fused map data and corresponding map data points of the ground truth map data, wherein the map fusion offset represents an absolute map error;
   evaluate map fusion performance by comparing a mean value and a standard deviation of the map fusion offset with the mean value and a standard deviation of the first offset, and by comparing the mean value and the standard deviation of the map fusion offset with the mean value and a standard deviation of the second offset;
   transmit, over a wireless connection, the fused map data to an autonomous vehicle; and
   control, by an autonomous driving system of the autonomous vehicle, motion of the autonomous vehicle based on the fused map.

2. The system of claim 1, wherein the plurality of bounding boxes each represent a single unit for executing the map-matching registration algorithm to align the two or more versions of map data with one another.

3. The system of claim 1, wherein each of the plurality of bounding boxes include a lateral dimension and a longitudinal dimension that correspond to a perception range for a vehicle.

4. The system of claim 1, wherein a plurality of nodes each represents an endpoint of one of the road segments.

5. The system of claim 4, wherein the road network includes a plurality of line strings, and wherein each line string connects two of the plurality of nodes together.

6. The system of claim 1, wherein the map-matching registration algorithm is an iterative closest point (ICP) algorithm.

7. The system of claim 1, wherein the two or more versions of map data are each based on one or more of the following: global positioning system (GPS) data, image data collected by an on-board camera for a vehicle, a high-speed vehicle telemetry (HSVT) source, satellite image data, and data collected from survey vehicles.

8. The system of claim 1, wherein the one or more central computers execute instructions to:
   create a sensor noise model based on the ground truth map data and the set of closest matched map data points for each bounding box that is part of the road network.

9. The system of claim 1, wherein a portion of map data points that are part of the set of closest matched map data points represent one or more landmarks.

10. A method for fusing two or more versions of map data together, the method comprising:
    receiving, by one or more central computers, road network data representing a road network for a singular predefined geofenced area, wherein the road network is a graph that models roadways based on a plurality of road segments;
    computing, by the one or more central computers, a plurality of points that are each positioned at a predetermined distance from one another, wherein the plurality of points divides an individual road segment of the plurality of road segments by the predetermined distance;

creating, by the one or more central computers, a plurality of bounding boxes for the road network based on the plurality of points, wherein the predetermined distance between two of the plurality of points represents a width of one of the plurality of bounding boxes;

creating, by the one or more central computers, a set of closest matched map data points for each bounding box that is part of the road network by executing a map-matching registration algorithm to align the two or more versions of map data with one another, wherein each version of the map data represents the same predefined geofenced area;

executing a maximum likelihood estimation algorithm to determine probability distribution parameters of the set of closest matched map data points compared to ground truth map data, wherein the probability distribution parameters include a mean value of a first offset between a first set of map data points and the ground truth map data, a mean value of a second offset between a second set of map data points and the ground truth map data, a variance of the first offset, and a variance of the second offset;

fusing the set of closest matched map data points together to create fused map data based on the probability distribution parameters;

calculating a map fusion offset between individual fused map data points of the fused map data and corresponding map data points of the ground truth map data, wherein the map fusion offset represents an absolute map error;

evaluating map fusion performance by comparing a mean value and a standard deviation of the map fusion offset with the mean value and a standard deviation of the first offset, and by comparing the mean value and the standard deviation of the map fusion offset with the mean value and a standard deviation of the second offset;

transmitting, over a wireless connection, the fused map data to an autonomous vehicle; and controlling, by an autonomous driving system of the autonomous vehicle, motion of the autonomous vehicle based on the fused map.

11. A system for fusing two or more versions of map data together, the system comprising:

one or more central computers in wireless communication with one or more communication networks for receiving the two or more versions of map data and ground truth map data, wherein each version of the map data represents a singular predefined geofenced area, the one or more central computers executing instructions to:

receive road network data representing a road network for the predefined geofenced area, wherein the road network is a graph that models roadways based on a plurality of road segments;

compute a plurality of points that are each positioned at a predetermined distance from one another, wherein the plurality of points divides an individual road segment of the plurality of road segments by the predetermined distance;

create a plurality of bounding boxes for the road network based on the plurality of points, wherein the plurality of bounding boxes each represent a single unit for executing an ICP algorithm to align the two or more versions of map data with one another, wherein the predetermined distance between two of the plurality of points represents a width of one of the plurality of bounding boxes;

create a set of closest matched map data points for each bounding box that is part of the road network by executing the ICP algorithm to align the two or more versions of map data with one another;

execute a maximum likelihood estimation algorithm to determine probability distribution parameters of the set of closest matched map data points compared to ground truth map data, wherein the probability distribution parameters include a mean value of a first offset between a first set of map data points and the ground truth map data, a mean value of a second offset between a second set of map data points and the ground truth map data, a variance of the first offset, and a variance of the second offset;

fuse the set of closest matched map data points together to create fused map data based on the probability distribution parameters;

calculate a map fusion offset between individual fused map data points of the fused map data and corresponding map data points of the ground truth map data, wherein the map fusion offset represents an absolute map error;

evaluate map fusion performance by comparing a mean value and a standard deviation of the map fusion offset with the mean value and a standard deviation of the first offset, and by comparing the mean value and the standard deviation of the map fusion offset with the mean value and a standard deviation of the second offset;

transmit, over a wireless connection, the fused map data to an autonomous vehicle; and control, by an autonomous driving system of the autonomous vehicle, motion of the autonomous vehicle based on the fused map.

* * * * *